United States Patent
Friedman

(10) Patent No.: US 6,182,029 B1
(45) Date of Patent: Jan. 30, 2001

(54) SYSTEM AND METHOD FOR LANGUAGE EXTRACTION AND ENCODING UTILIZING THE PARSING OF TEXT DATA IN ACCORDANCE WITH DOMAIN PARAMETERS

(75) Inventor: Carol Friedman, Larchmont, NY (US)

(73) Assignee: The Trustees of Columbia University in the City of New York, New York, NY (US)

(*) Notice: Under 35 U.S.C. 154(b), the term of this patent shall be extended for 0 days.

(21) Appl. No.: 09/370,329

(22) Filed: Aug. 6, 1999

Related U.S. Application Data

(63) Continuation-in-part of application No. 08/738,889, filed on Oct. 28, 1996, now Pat. No. 6,055,494.

(51) Int. Cl.⁷ .................................................. G06F 17/27
(52) U.S. Cl. ............................... 704/9; 707/513; 707/531
(58) Field of Search ........................ 704/9, 1, 10; 705/2, 705/3; 707/104, 513, 531, 532, 533, 534; 706/45, 46, 55, 59

(56) References Cited

U.S. PATENT DOCUMENTS

| | | | |
|---|---|---|---|
| 5,799,268 | * 8/1998 | Boguraev | 704/9 |
| 5,832,496 | * 11/1998 | Anand et al. | 707/102 |
| 6,038,668 | * 3/2000 | Chipman et al. | 713/201 |
| 6,055,494 | * 4/2000 | Friedman | 704/9 |
| 6,076,088 | * 6/2000 | Paik et al. | 707/5 |

OTHER PUBLICATIONS

Friedman, et al., "Natural Language Processing in an Operational Clinical Information System", Natural Language Engingeering, vol. 1(1), pp. 83–108, May 1995.*

G. Hripcsak, C. Friedman, P. Alderson, W. DuMouchel, S. Johnson, P. Clayton, "Unlocking Clinical Data From Narrative Reports," Ann. of Int. Med., vol. 122(9), pp. 681–688 (1995).*

P. Haug, D. Ranum, P. Frederick, "Computerized Extraction of Coded Findings from Free–Text Radiologic Report," Radiology, vol. 174, pp. 543–548 (1990).*

P. Zweigenbaum, B. Bachimont, J. Bouaud, J. Charlet and J. A. Boisvieux, "A Multi–lingual Architecture for Building a Normalized Conceptual Representation from Medical Language," Proceedings of the 19th Annual SCAMC; pp. 357–361 (1995).*

R. Baud, A. Rassinoux, J. Scherrer, "Natural Language Processing and Semantical Representation of Medical Texts," Meth. of Info. Med., vol. 31(2), pp. 117–125 (1993).*

L. Lenert and M. Tovar, "Automated Linkage of Free–Text Descriptions of Patients with a Practice Guideline," Proceedings of the 17th Annual SCAMC, pp. 274–278 (Ozbolt ed. 1993).*

(List continued on next page.)

* cited by examiner

Primary Examiner—Joseph Thomas
(74) Attorney, Agent, or Firm—Baker Botts LLP

(57) ABSTRACT

A computerized method for extracting information from natural-language text data includes parsing the text data to determine the grammatical structure of the text data and regularizing the parsed text data to form structured word terms. The parsing step, which can be performed in one or more parsing modes, includes the step of referring to a domain parameter having a value indicative of a domain from which the text data originated, wherein the domain parameter corresponds to one or more rules of grammar within a knowledge base related to the domain to be applied for parsing the text data. Preferably, the structured output is mapped back to the words in the original sentences of the text data input using XML tags.

39 Claims, 5 Drawing Sheets

Microfiche Appendix Included
(5 Microfiche, 465 Pages)

OTHER PUBLICATIONS

M. Gundersen, P. Haug, T. Pryor, R. van Bree, S. Koehler, K. Bauer, B. Clemons, "Development and Evaluation of a Computerized Admission Diagnoses Encoding System," *Computers and Biomedical Research*, vol. 29, pp. 351–372 (1996).*

C. Lovis, J. Gaspoz, R. Baud, P. Michel and J. Scherrer, "Natural Language Processing and Clinical Support to Improve the Quality of Reimbursement Claim Databases," *Proceedings of the 1996 AMIA Fall Annual Symposium*, p. 899 (Henley & Belfus 1996).*

N. Sager et al., "Medical Language Processing With SGML Display," *Proceedings of the 1996 AMIA Fall Annual Symposium*, pp. 547–551 (1996).*

P. Zweigenbaum et al., "From Text to Knowledge: A Unifying Document–Oriented View of Analyzed Medical Language," Workshop on Medical Concept Representation and Natural Language Processing, *IMIA WG6*, pp. 21–29 (1997).*

R. Dolin et al., "SGML as a Message Interchange Format in Healthcare," Proceeding of the 1997 Fall AMIA Annual Symposium, pp. 635–639 (1997).*

400

<address> <street> <number> 124 </number> <street_name> Barrows Lane </street_name> </street> <city> New York </city> <state> NY </state> <zipcode> 10001 </zipcode> </address>

500

```
<?xml version ="1.0"?>
<!-- DTD for report style output generated by MedLEE  -->
<!ELEMENT medleeOut  (section)+>
<!ELEMENT section   (structured?,tt)>
<!ELEMENT structured (problem|procedure)*>
<!ELEMENT problem
        (certainty|degree|status|change|bodyloc|region|sid|idref)*>
 <!ELEMENT procedure
        (certainty|degree|status|change|bodyloc|region|sid|idref)*>
<!ELEMENT degree   (degree)*>
<!ELEMENT certainty  EMPTY>
<!ELEMENT change  (certainty|degree|change)*>
<!ELEMENT descriptor EMPTY>
<!ELEMENT status EMPTY>
<!ELEMENT sid EMPTY>
<!ELEMENT bodyloc  (region|bodyloc)*>
<!ELEMENT region (region)*>
<!ELEMENT tt   (#PCDATA |  sent )*>
<!ELEMENT sent  (#PCDATA|phr|undef)*>
<!ELEMENT phr  (#PCDATA)>
<!ELEMENT undef  (#PCDATA)>
<!ATTLIST section c CDATA  #REQUIRED>
<!ATTLIST sent id ID    #REQUIRED>
<!ATTLIST phr id ID   #REQUIRED>
<!ATTLIST problem v CDATA  #REQUIRED
                idref IDREFS #IMPLIED>
<!ATTLIST procedure v CDATA  #REQUIRED
                idref IDREFS #IMPLIED>
<!ATTLIST region v CDATA  #REQUIRED
             idref IDREFS #IMPLIED>
<!ATTLIST bodyloc v CDATA  #REQUIRED
             idref IDREFS #IMPLIED>
<!ATTLIST degree v CDATA  #REQUIRED
              idref IDREFS #IMPLIED>
<!ATTLIST sid idref IDREFS #REQUIRED>
<!ATTLIST certainty v CDATA   #REQUIRED
            idref IDREFS #IMPLIED>
```

```
<structured>
    <problem v = "pain" idref = "p2>
        <bodyloc v = "abdomen" idref = "p3">
            <region v = "lower" idref = "p4"> </region>
        </bodyloc>
        <onset v = "intermittent" idref = "p1"> </onset>
        <status v = "develop" idref = "p6"> </status>
        <date v = "19950304" idref = "p8">
        <sid idref = "s1.1.1">
    </problem>
    <problem v = "swelling" idref = "p13">
        <certainty v = "no" idref = "p12"> </certainty>
        <bodyloc v = "extremity" idref = "p14"> </bodyloc>
        <sid idref = "s1.1.2">
    </problem>
</structured>
```

```
<tt>
 <section c = "history of present illness" > History of present illness: <sent id =
"s1.1.1"> <phr id = "p1"> Intermittent </phr> <phr id = "p2"> pain </phr>  in <phr id =
"p4"> right </phr> <phr id = "p5"> arm </phr> <phr id = "p6"> developed </phr>  on
<phr id = "p8"> 3/4/95 </phr>. <sid id = "s1.1.2"> There was <phr id = "p11"> no
evidence of </phr> <phr id = "p12"> swelling </phr> in <phr id = "p14"> extremities
</phr>.
</tt>
```

```
<structured>
        <problem v = "splenomegaly idref = "p2 p7">
                                <bodyloc v = "spleen" idref = "p2"> </bodyloc>
                                <certainty v = "high certainty" idref = p5">
</certainty>
        </problem>
        <problem v = "hepatomegaly" idref = "p4 p7">
                                <bodyloc v = "liver" idref = "p4"> </bodyloc>
                                <certainty v = "high certainty" idref = "p5">
</certainty>
        </problem>
</structured>
<tt>
```

SYSTEM AND METHOD FOR LANGUAGE EXTRACTION AND ENCODING UTILIZING THE PARSING OF TEXT DATA IN ACCORDANCE WITH DOMAIN PARAMETERS

SPECIFICATION

This application is a continuation-in-part of U.S. application Ser. No. 08/738,889 filed Oct. 28, 1996, now U.S. Pat. No. 6,055,494 which is incorporated herein by reference.

STATEMENT REGARDING FEDERALLY SPONSORED RESEARCH

The invention described herein and claimed was funded in part by a grant from the National Library of Medicine, namely, Grant #'s LM06274 and LM05627. The United States Government may have certain rights to the invention.

STATEMENT REGARDING MATERIAL SUBJECT TO COPYRIGHT

A portion of the disclosure of this patent document contains material which is subject to copyright protection. The copyright owner has no objection to the facsimile reproduction by anyone of any portion of the patent document, as it appears in any patent granted from the present application or in the Patent and Trademark Office file or records available to the public, but otherwise reserves all copyright rights whatsoever.

A microfiche appendix containing source code utilized in practicing an exemplary embodiment of the invention is included as part of the Specification and is hereinafter referred to as Appendix A. Appendix A includes a total of 5 microfiche and a total of 465 frames.

1. Field of the Invention

This invention relates to the computerized processing of natural-language phrases used in specialized areas of expertise such as medicine, clinical sciences, genomics, etc. More particularly, the present invention is related to the extraction and encoding of information from natural-language text sources such as physician reports and technical and scientific literature.

2. Background of the Invention

Conventional automated methods and systems, in particular in the area of clinical medicine, have been developed for producing standardized, encoded representations of extracted "natural-language" textual data. Such systems are useful for extracting clinical information from examination reports, medical histories, progress notes, and discharge summaries. Further, specialized techniques have been developed for use with different types of pathology, radiology and surgery reports.

Although textual patient documents often provide valuable clinical data, most conventional systems provide textual information that cannot be reliably accessed by automated applications. To enable access to the information, however, medical language processing (MLP) systems have been developed that extract and structure information in patient reports in order to organize and encode the pertinent information appropriately for subsequent clinical applications. See, e.g., N. Sager, M. Lyman, C. Buchnall, N. Nhan and L. Tick, "Natural Language Processing and the Representation of Clinical Data," *JAMIA*, vol. 1 (2), pp. 142–160 (1994); C. Friedman, P. O. Alderson, J. Austin, J. J. Cimino and S. B. Johnson, "A General Natural Language Text Processor for Clinical Radiology," *JAMIA*, vol. 1 (2), pp. 161–174 (1994); G. Hripcsak, C. Friedman, P. Alderson, W. DuMouchel, S. Johnson, P. Clayton, "Unlocking Clinical Data From Narrative Reports," Ann. of Int. Med., vol. 122 (9), pp. 681–688 (1995); P. Haug, D. Ranum, P. Frederick, "Computerized Extraction of Coded Findings from Free-Text Radiologic Report," *Radiology*, vol. 174, pp. 543–548 (1990); P. Zweigenbaum, B. Bachimont, J. Bouaud, J. Charlet and J. A. Boisvieux, "A Multi-lingual Architecture for Building a Normalized Conceptual Representation from Medical Language," *Proceedings of the 19th Annual SCAMC*; pp. 357–361 (1995); R. Baud, A. Rassinoux, J. Scherrer, "Natural Language Processing and Semantical Representation of Medical Texts," Meth. of Info. Med., vol. 31 (2), pp. 117–125 (1993); and L. Lenert and M. Tovar, "Automated Linkage of Free-Text Descriptions of Patients with a Practice Guideline," *Proceedings of the 17th Annual SCAMC*, pp. 274–278 (Ozbolt ed. 1993).

Of particular further interest is a general approach which is based on concepts and techniques described in the following papers: C. Friedman et al., "A Conceptual Model for Clinical Radiology Reports," In: C. Safran, ed., *Seventeenth Symposium for Computer Applications in Medical Care*, New York, McGraw-Hill, March 1994, pp. 829–833; C. Friedman et al., "A General Natural-Language Text Processor for Clinical Radiology," *Journal of the American Medical Informatics Association*, Vol. 1 (April 1994), pp. 161–174; C. Friedman et al., "A Schema for Representing Medical Language Applied to Clinical Radiology," *Journal of the American Medical Informatics Association*, Vol. 1 (June 1994), pp. 233–248; C. Friedman et al., "Natural Language Processing in an Operational Clinical Information System," *Natural Language Engineering*, Vol. 1 (March 1995), pp. 83–106.

Despite the advancement of medical and natural language processing systems, conventional systems remain limited to specific areas of expertise (i.e., domains) and can only be used on a limited number of dedicated computing platforms. Examples of such conventional systems include those used for decision support and quality assurance tasks. See, e.g., N. Sager, M. Lyman, C. Buchnall, N. Nhan and L. Tick, "Natural Language Processing and the Representation of Clinical Data," *JAMIA*, vol. 1 (2), pp. 142–160 (1994); G. Hripcsak, C. Friedman, P. Alderson, W. DuMouchel, S. Johnson, P. Clayton, "Unlocking Clinical Data From Narrative Reports," Ann. of Int. Med., vol. 122 (9), pp. 681–688 (1995); P. Haug, D. Ranum, P. Frederick, "Computerized Extraction of Coded Findings from Free-Text Radiologic Report," *Radiology*, vol. 174, pp. 543–548 (1990); and L. Lenert and M. Tovar, "Automated Linkage of Free-text Descriptions of Patients with a Practice Guideline," Proceedings of the 17th Annual SCAMC, pp. 274–278 (Ozbolt ed. 1993). Other systems automatically generate ICD codes from text to assist in generating billing codes. See, e.g., M. Gundersen, P. Haug, T. Pryor, R. van Bree, S. Koehler, K. Bauer, B. Clemons, "Development and Evaluation of a Computerized Admission Diagnoses Encoding System," *Computers and Biomedical Research*, vol. 29, pp. 351–372 (1996); and C. Lovis, J. Gaspoz, R. Baud, P. Michel and J. Scherrer, "Natural Language Processing and Clinical Support to Improve the Quality of Reimbursement Claim Databases," *Proceedings of the 1996 AMIA Fall Annual Symposium*, p. 899 (Henley & Belfus 1996). Although output generated by these systems are structured so that it may be used by different automated applications, conventional systems remain unable to map the structured output directly to corresponding text in the original report. Other systems use comprehensive syntactic and semantic knowledge, and include knowledge about the structure of complete sentences.

Still other systems rely more heavily on semantic and local phrasal information. RECIT, for example, uses syntactical information to recognize the structure of local phrases and interleaves phrase recognition with semantic knowledge in order to assemble semantically relevant groupings and representations. See Zweigenbaum et al., "A Multi-Lingual Architecture for Building a Normalized Conceptual Representation from Medical Language," *Proceedings of the 19th Annual SCAMC*, pp. 357–361 (1995). SPRUS, which was initially purely semantically driven, uses semantic information relating to words in a sentence along with expectations about findings, locations and conditions associated with the words. See, e.g., G. Hripcsak et al., Unlocking Clinical Data from Narrative Reports," *Ann. of Int. Med.*, vol. 122 (9), pp. 681–688 (1995); N. Sager et al., "Medical Language Processing With SGML Display," *Proceedings of the 1996 AMIA Fall Annual Symposium*, pp. 547–551 (1996). More recent versions of SPRUS have integrated some syntax into the processing. Other MLP systems use methods that are based on pattern matching and keyword searching.

Other conventional systems enrich patient reports by using predefined tags for the purpose of facilitating highlighting, manual review and limited automated retrieval of information. See, e.g., N. Sager et al., "Medical Language Processing With SGML Display," *Proceedings of the 1996 AMIA Fall Annual Symposium*, pp. 547–551 (1996); P. Zweigenbaum et al., "From Text to Knowledge: A Unifying Document-Oriented View of Analyzed Medical Language," Workshop on Medical Concept Representation and Natural Language Processing," *IMIA WG6*, pp. 21–29 (1997). The problem with these approaches, however, is that automated retrieval of documents containing the desired information cannot be performed with sufficient accuracy. For example, if all documents containing a tag for "cardiomegaly" were retrieved, many reports would be obtained which correspond to the negation of cardiomegaly, as in "cardiomegaly was not observed."

A number of medical language processing systems have been developed that structure and/or encode information occurring in textual clinical reports so that the information can be used for automated decision support and for facilitating document manipulation and viewing by the user.

In the healthcare field, for example, there have been a number of articles that report on the use of SGML and XML to tag medical documents. See, e.g., R. Dolin et al., "SGML as a Message Interchange Format in Healthcare," Proceeding of the 1997 Fall AMIA Annual Symposium, pp. 635–639 (1997). A special interest group, HL7-SGML/XML, has been formed to further promote the use of SGML and XML in the electronic patient records. See HL7 SGML/XML Special Interest Group web site at http://www.mcis.duke.edu/standards/HL7/committees/sgml/. In particular, the group's effort involves specifications for embedding XML within the HL7 structure and for developing a model of medical documents to facilitate exchange of documents between users. See *The HL7 Document Patient Record Architecture*, http://www.mcis.duke.edu/standards/HL7/committee/sgml/WhitePapers/Prap. Another goal is to enable automated applications to process the documents after the document exchange has been made.

Within the medical language processing community, so-called "document-centered" approaches have been described to tag medical documents. Sager, for example, first described the utility of augmenting textual patient reports using SGML by means of MLP in order to provide tools to facilitate document handling for health care workers. See N. Sager et al., "Medical Language Processing with SGML Display," *Proceedings of the 1996 AMIA Fall Annual Symposium*, pp. 547–551 (1996). One relatively simple task would be to tag the words and phrases of the text according to semantic and syntactic categories, and another would be to tag the report according to sections and paragraphs. Sager also proposed the use of a more complex tagging schema, such as tagging occurrences of diagnoses, that could be later be used to retrieve pertinent clinical information.

Zweigenbaum also proposed the adoption of an "enriched-document" paradigm based on SGML and natural language processing to further the dissemination of applications that utilize natural language processing methodology. See P. Zweigenbaum et al., "From Text to Knowledge: a Unifying Document-oriented View of Analyzed Medical Language," Workshop on Medical Concept Representation and Natural Language Processing," *IMIA WG6*, pp. 21–29 (1997). A number of benefits of using a document-oriented model were discussed including the ability to use annotated text as a valuable resource to further the development of language processing systems. Zweigenbaum also proposed embedding a conceptual graphical representation into each sentence of a document.

A major disadvantage however of the document-centered approaches disclosed by Sager and Zweigenbaum is that accurate access of the information is elusive because the tagging schemas are extensively intertwined with the text and dependent on word order, which is extremely varied and unpredictable. Conventional document-centric techniques are thus not well-suited for searching purposes due to dependencies on the ordering of the phrases within the text. These techniques are also inadequate in that the structured XML forms include references to portions of the original text that ultimately limit the amount of information available to the user.

Thus, a need exists to provide medical and natural language processing techniques that provide structured data output that can be used for a variety of different applications across a variety of different computing platforms.

SUMMARY OF THE INVENTION

The aforedescribed limitations and inadequacies of conventional language extraction methods are substantially overcome by the present invention, in which a primary object is to provide a natural language processing system for extracting information from a natural language document input that can be easily adapted for use in a variety of areas of expertise by modifying, if necessary, one or more corresponding knowledge components. For example, by using different lexicons and/or grammar knowledge bases, the natural language processing system of the present invention can be used for extracting medical/clinical data from physician reports and genomics-related information from electronic text sources.

It is another object of the present invention to provide a natural language processing system that extracts relevant information from a document input and generates an enriched, structured output that enables reliable and efficient access to information found in the original document input. Such a capability is useful for retrieving and summarizing relevant information from a variety of document types, such as patient reports and technical publications, for a broad range of medical, clinical and scientific applications.

It is yet another object of the present invention to provide an automated method using natural language processing techniques for extracting information from a document input.

It is still another object of the present invention to provide an automated method using natural language processing techniques for mapping textual data from an original document input into a structured output form.

A preferred method for extracting information from natural language data includes basic steps here designated as phrase parsing and regularizing and, optionally, code selection. Further included, preferably, is a step of pre-processing prior to phrase parsing, and a step of output filtering. A structured output can be generated in the form of a printout, as a monitor display, as a database entry, or via the Internet, for example. Preferably, the structured output is then mapped back to the words in the original sentences of the text data input.

In processing, one or several parameters are referred to. The parameters are associated with options. To choose an option, the appropriate value is assigned to the parameter. A parameter can have a value by default. Of particular importance is the inclusion of a parameter which is associated with the medical/clinical domain or sub-field of the input data. Other parameters may be associated with the level of parsing accuracy desired, whether code selection is desired, the type of filtering, or the format of the output.

The method can be expressed in a high-level computer language such as Prolog, for example, for execution as a system on a suitable general-purpose computer. In the following, the method and the system will be referred to by the acronym MedLEE, short for Medical Language Extraction and Encoding.

Further objects, features and advantages of the invention will become apparent from the following detailed description taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein:

FIG. 5 is an example document type definition (DTD) corresponding to the tagging scheme of FIG. 4);

FIG. 6 is an example of a structured component in accordance with the information extraction system of FIG. 3;

FIG. 7 is an example of a tagged text component in accordance with the information extraction system of FIG. 3;

A microfiche appendix attached hereto includes a printout of computer source code for the MedLEE computer program.

DETAILED DESCRIPTION OF THE INVENTION

Figure 1:
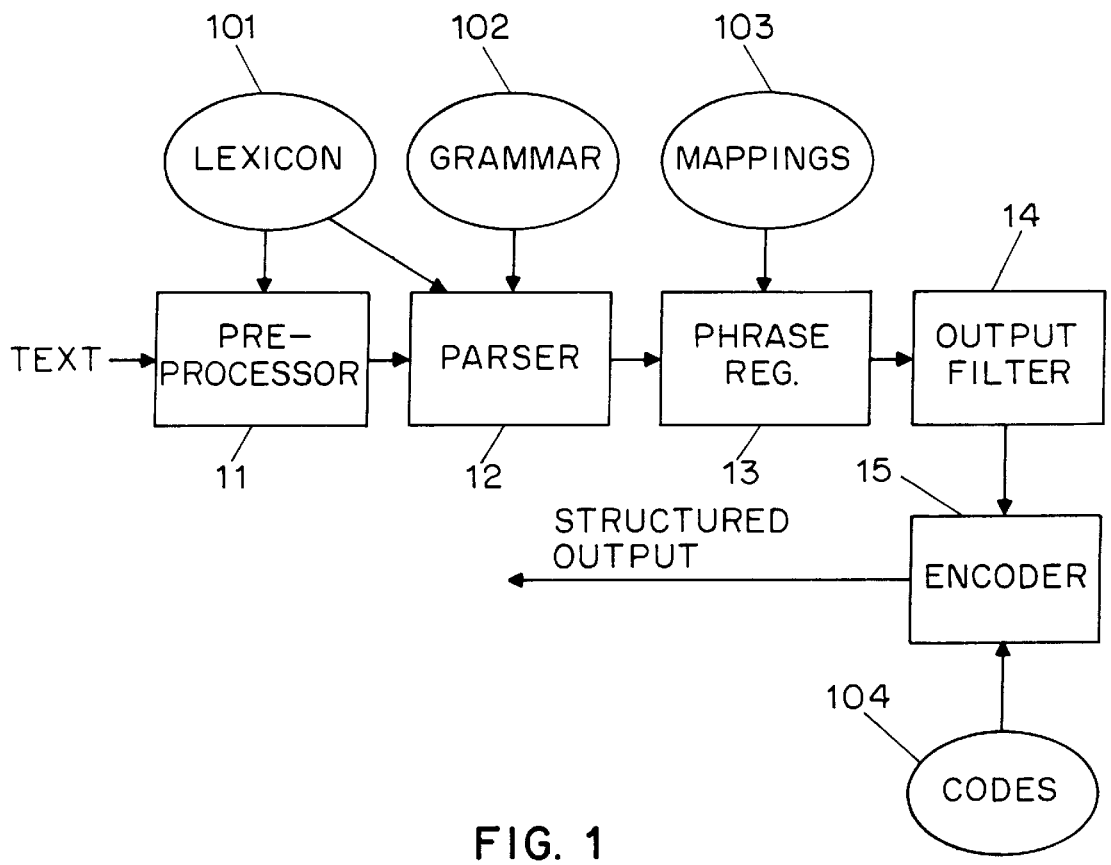
FIG. 1 is a block diagram of an information extraction system in accordance with a preferred embodiment of the present invention.
Figures 3, 4:
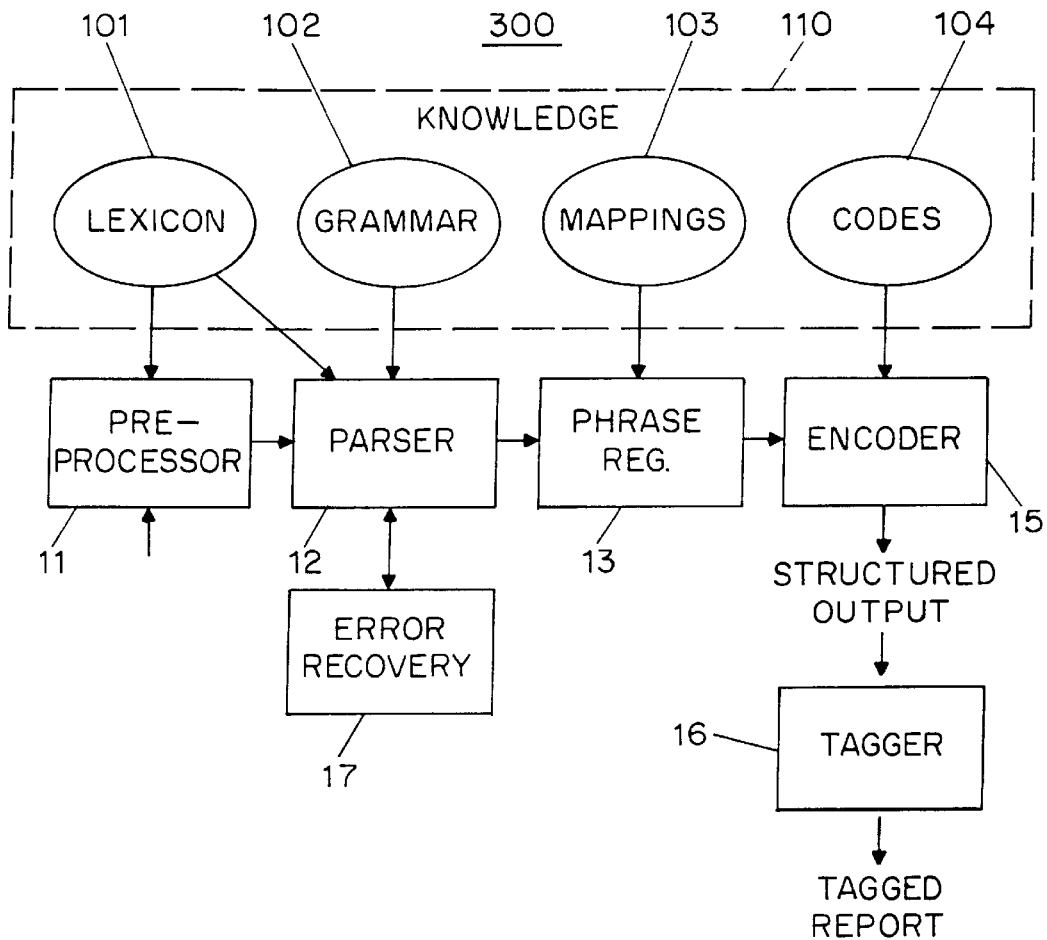
FIG. 3 is a block diagram of an information extraction system in accordance with another preferred embodiment of the present invention.
FIG. 4 is an example XML tagging scheme for address entry.

FIG. 1 is a block diagram of an information extraction system in accordance with a preferred embodiment of the present invention. The information extraction system of FIG. 1, known as MedLEE, is designed for use as a general processor within the medical domain, e.g., radiography, mammography, neuroradiology, pathology, and electrocardiography, etc. Although used for language extraction in the medical/clincal context, MedLEE can be adapted for use in other domains such as genomics. An additional preferred embodiment of MedLEE is shown in FIG. 3, wherein the MedLEE embodiment is written in Quintus Prolog and uses the Unix or Windows operating systems, is described in detail below.

The Appendix below provides both "stand-alone" and "server" versions, ml_parser.pl and ml_server.pl, respectively, of the information extraction system of FIG. The stand-alone version ml_parser.pl is a top level control program that establishes input and output data streams, writes error messages to the user, and calls the main program radrec.pl. The server version ml_server.pl is similar to the stand-alone except that it is designed to begin processing upon receiving a request from a client server. In addition, Medleefunc.pl is a function that allows another process to compile the MedLEE program into a host system by using a function call.

A natural-language phrase included in text document is understood as a delimited string comprising natural-language terms or words. The string is computer-readable as obtained, e.g., from a pre-existing database, or from keyboard input, optical scanning of typed or handwritten text, or processed voice input. The delimiter may be a period, a semicolon, an end-of-message signal, a new-paragraph signal, or any other suitable symbol recognizable for this purpose. Within the phrase, the terms are separated by another delimiter, e.g., a blank or another suitable symbol.

As a result of phrase parsing, terms in a natural-language phrase are classified, e.g., as referring to a body part, a body location, a clinical condition or a degree of certainty of a clinical condition, and the relationships between the terms are established and represented in a standard form. For example, in the phrase "moderate cardiac enlargement", "moderate" is related to "enlargement" and cardiac is also related to "enlargement". Similarly, in a genomics-related example, where natural language phrases are classified as proteins, genes and actions, "protein X" and "gene Y" are related to the action "activate" in the term "X activates Y".

In the interest of versatility and applicability of the system to different domains or sub-domains, parsing can be domain or sub-domain specific in accordance with the value of a domain parameter used by the system. Depending on the value of the domain parameter, the appropriate rules can be referred to in parsing by the system.

While parsing may be based primarily on semantics or meaning, use of syntactic or grammatical information is not precluded.

Regularizing involves bringing together terms which may be discontiguous in a natural-language phrase but which belong together conceptually as a structured word term. Regular forms or composites ("compositional mappings") are obtained. Regularizing may involve reference to a separate knowledge base. For example, from each of the phrases "heart is enlarged", "enlarged heart", "heart shows enlargement" and "cardiac enlargement", a regularizer can generate "enlarged heart".

In code selection, which is optional, a common, unique vocabulary term or code is assigned to each regular term by reference to yet another knowledge base which may also be chosen domain specific. For example, in the domain of X-ray diagnostics, the term "cystic disease" has a different meaning as compared with the domain of mammography.

FIG. 1 shows a preprocessor module 11 by which natural-language input text is received. The preprocessor uses the lexicon knowledge base 101 and handles abbreviations, which may be domain dependent. The preprocessor 11 thus performs lexical lookup to identify and categorize multi-word and single word phases within each sentence. The output of this component consists of a list of word positions where each position is associated with a word or multi-word phrase in the report. For example, assuming that the sentence "spleen appears to be moderately enlarged" is at the beginning of the report, it would be represented as the list where position 1 is associated with "spleen", position 2 with the multi-word phrase "appears to be", position 5 with "moderately", and 6 with "enlarged". The remainder of the list of word positions would be associated with the remaining words in the report.

With the domain parameter properly set, the preprocessor refers to the proper knowledge base. For example, depending on the domain, the abbreviation "P.E." can be understood as physical examination or as pleural effusion. Also, the preprocessor determines phrase or sentence boundaries, and generates a list form for each phrase for further processing by the parser module 12.

The second component of the MedLEE system is the parser. It utilizes the grammar and categories assigned to the phrases of a sentence to recognize well-formed syntactic and semantic patterns in the sentence and to generate intermediate forms. The target form generated by the parser for the sample phrase "spleen is moderately enlarged" would be the frame: [problem,6,[bodyloc,1],[degree,5],[certainty,2]]. In this form, the value of each frame is a number representing the position of the corresponding phrase in the report. In a subsequent stage of processing the number will be replaced by an output form that is the canonical output specified by the lexical entry of the word or phrase in that position and a reference to the position in the text. The parser proceeds by starting at the beginning of the sentence position list and following the grammar rules. When a semantic or syntactic category is reached in the grammar, the lexical item corresponding to the next available unmatched position is obtained and its corresponding lexical definition is checked to see whether or not it matches the grammar category. If it does match, the position is removed from the unmatched position list, and the parsing proceeds. If a match is not obtained, an alternative grammar rule is tried. If no analysis can be obtained, an error recovery procedure is followed so that a partial analysis is attempted.

The parser module 12 uses the lexicon 101, and a grammar module 102 to generate intermediate target forms. Thus, in addition to parsing of complete phrases, sub-phrase parsing can be used to advantage where highest accuracy is not required. In case a phrase cannot be parsed in its entirety, one or several attempts can be made to parse a portion of the phrase for obtaining useful information in spite of some possible loss of information. For example, in the phrase "spleen was enlarged after going to the movies", the words "spleen was enlarged" are processed and the remaining words are skipped.

The next component of the natural language processing system performs phrase regularization. It first replaces each position number with the canonical output form specified in the lexical definition of the phrase associated with its position in the report. It also adds a new modifier frame idref for each position number that is replaced. For example, the sample output form shown above would be changed to:

[problem,enlarged,[idref,6],[bodyloc,spleen,[idref,1]], [degree,severe, [idref,5]], [certainty,appear,[idref,2]]].

This stage also composes multi-word phrases, i.e., compositional mappings, which are separated in the documents. For example, in the sample sentence, the individual components of the multi-word term "enlarged spleen" are separated. "Spleen" and "enlarged" are composed during phrase regularization and mapped into the target form "enlarged spleen" so that the output at this stage would be:

[problem,enlarged spleen,[idref,[6,1]],[bodyloc,spleen, [idref,1]], [degree,severe,[idref,3]],[certainty,appear, [idref,2]]].

Notice that the value of idref for the frame problem is a list [6,1] rather than a single value because two words in the text report which are separated from each other constitute the components of the term enlarged spleen. Mapping knowledge bases maps.pl amd mmaps.pl are used by the regularizer 13. In accordance with a preferred embodiment of the present invention, maps.pl is a knowledge base of "standard", automatically generated compositional mappings and mmaps.pl is a knowledge base of manually generated compositional mappings.

With the parsed forms as input, and using mapping information 103, the phrase regularizer 13 composes regular terms as described above.

From the regularized phrases, the filter module 14 deletes information on the basis of parameter settings. For example, a parameter can be set to call for removal of negative findings. A preferred embodiment of the filter module 14 is shown by the removefromtarg routine of the radrec.pl file provided in the Appendix.

The next component performs the encoding. This consists of mapping the canonical forms into controlled vocabulary terms if applicable. In this example, we assume the controlled term for "enlarged spleen" is "splenomegaly", the controlled term for "moderate" is "moderate degree", and the controlled term for "appears" is "moderate certainty". The target form would be translated into:

[problem,splenomegaly,[idref,[6,1]],[bodyloc,spleen, [idref,1]], [degree,'moderate degree',[idref,3]], [certainty,'moderate certainty',[idref,2]]].

The encoder module 15 uses a table of codes 104 to translate the regularized forms into unique concepts which are compatible with a clinical controlled vocabulary. A preferred embodiment of the encoder module 15 is shown by the computecode routine of the newform.pl file provided in the Appendix.

The last component, tagger 16 of FIG. 3, is used to "tag" the original text data with a structured data component. In a system using an XML format, for example, the system of the present invention will generate the following output for the phrase "spleen is moderately enlarged" discussed above:

<problem v="splenomegaly" idref="p1 p6"><bodyloc v="spleen" idref="p1"></bodyloc><degree v="moderate degree"idref="p3"></degree><certainty v="moderate certainty" idref="p2"></certainty></problem>.

Figure 2:
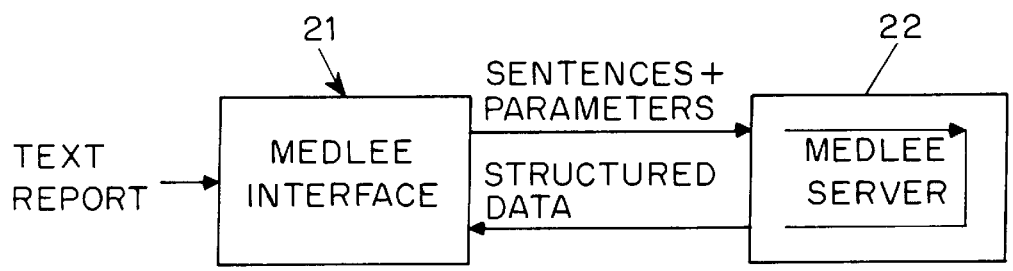
FIG. 2 is a block diagram of a system or application having an interface for the MedLEE system of FIG. 1.

FIG. 2 shows an interface module 21, and the MedLEE program 22 of FIG. 1. The interface module 21 may be domain-specific, and it may serve, e.g., to separate formatted sections from non-formatted sections in a report. Also, the interface 21 may serve to pass chosen parameter values to the MedLEE system 22 and to pass output from the MedLEE system. For example, such an interface can be designed for communication over the World-Wide Web or a local network, for input to or output from MedLEE.

Conveniently, each module is software-implemented and stored in random-access memory of a suitable computer, e.g., a work-station computer. The software can be in the form of executable object code, obtained, e.g., by compiling from source code. Source code interpretation is not precluded. Source code can be in the form of sequence-controlled instructions as in Fortran, Pascal or "C", for example. Alternatively, a rule-based system can be used such a Prolog, where suitable sequencing is chosen by the system at run-time.

An illustrative portion of the MedLEE system is shown in the Appendix in the form of a Prolog source listing with comments. The following is further to the comments.

Process_sents with get_inputsents, process_sects and outputresults reads in an input stream, processes sections of the input stream according to parameter settings, and produces output according to the settings. Among parameters supplied to Process_sents are the following: Exam (specifying the sub-domain in a medical/clinical domain), Mode (specifying the parsing mode), Amount (specifying the type of filtering), Type (specifying the output format) and Protocol (html or plain). Process_sents is called by another predicate, after user-specified parameters have been processed.

The parsing modes are selected by MedLEE so as to parse a sentence or phrase structure using a grammar that includes one or more patterns of semantic and syntactic categories that are well-formed. For example, for the phrase "pain in arms and legs", a legitimate pattern can be finding in bodyloc1 conj bodyloc2, wherein finding="pain", bodyloc1="arms" and bodyloc2="legs". However, if parsing fails, error recovery block 17 utilizes various error recovery techniques in order to achieve at least a partial analysis of the phrase. These error recovery techniques include, for example, segmenting a sentence or phrase at pre-defined locations and processing the corresponding sentence portions or sub-phrases. Each recovery technique is likely to increase sensitivity but decrease specificity and precision. Sensitivity is the performance measure equal to the true positive information rate of the natural language system, i.e., the ratio of the amount of information actually extracted by the natural language processing system to the amount of information that should have been extracted. Specificity is the performance measure equal to the true negative information rate of the system, i.e., the ratio of the amount of information not extracted to the amount of information that should not have been extracted. In processing a report, the most specific mode is attempted first, and successive less specific modes are used only if needed.

In accordance with the preferred embodiments of the present invention, the parser 12 of FIGS. 1 and 3 includes five parsing modes, Modes 1 through 5, for parsing sentences or phrases. Nominally, the parser 12 is configured to first select Mode 1 and then Modes 2 through 5 successively until parsing is completed. With Mode 1, the initial segment is the entire sentence and all words in the segment must be defined. This mode requires a well-formed pattern for the complete segment.

Mode 2 requires that the sentence or phrase be segmented at certain types of words or phrases, e.g., ". . . consistent with . . . ". Here, an attempt is made to recognize each segment independently, i.e., a first segment ending before the word "consistent" and a second segment beginning at the word "consistent". The segmenting process is repeated until an analysis of each segment is obtained or until segmenting is no longer possible. Segment.pl and segmentandparse in radpardb.pl provided in the Appendix specify phrases where a sentence may be segmented.

Mode 3 requires a well-formed pattern for the "largest" prefix of the segment, i.e., usually a prefix occurring in the beginning of a sentence. Thus, Mode 3 is useful when a sentence contains a pattern at the end which is not included in the grammar but a beginning portion that is included. For example, in the phrase "severe pain in arm developed on the fifth floor", the beginning of the phrase "on the fifth floor" will be skipped and "severe pain in arm developed" will be parsed.

Mode 4 requires that undefined words be skipped and an analysis be attempted in accordance with mode 1. Mode 4 processing is useful where there are typographical errors and unknown words. For example, in the phrase "a lxgre suspicious calcification was seen" the term "lrgx" will be skipped but the remainder of the phrase will be parsed.

Mode 5 first requires that the first word or phrase in the segment associated with a primary finding, e.g., "infiltrate", "mastectomy", "penicillin", etc.) be found. Next, an attempt is made to recognize the phrase starting with the leftmost recognizable modifier. For example, "in during severe pain in arm up to the fifth floor", the phrase "severe pain in arm" will be parsed and the remaining words will be skipped. If no analysis is found, recognition is retried at the next modifier to the right. This process continues until an analysis is found. A modification of this process exists if the leftmost modifier is a negation, because negative terms should not be skipped. For example, in the phrase "no abc pain in arm up to the fifth floor", the phrase "no pain in arm" will be parsed and the remaining words will be skipped. Analysis of the remaining portion of the segment uses the same process.

Process_sects with get_section and parse_sentences gets each section and generates intermediate output for the sentences in each section.

Outputresults with removefromtarg, write, writelines, markupsents and outputh17 filters output if appropriate, produces output in the appropriate format and optionally including formats tags for selected words of the original sentence, and produces error messages and an end-of-output message.

Setargs sets arguments or parameter values based on user input or by default.

Removefromtarg filters formatted output by leaving only positive clinical information and by removing negative findings and possibly findings associated with past information from the formatted output. If an input parameter is pos, only negative findings are removed; if the parameter is pac, both negative and positive findings are removed. Any number of different filters can be included as required. Write_structured generates the structured component of the output depending on the output format specified by the user.

Writelines produces one line per finding in list format, whereas writenested generates all findings at once. Writeindentform and writeindentform2 produce output in indented form. Writesgmlfroms generates output in XML form, and writetabular generates output in tabular form.

The routine markupsents envelopes the original sentence with tags so that the clinical information is highlighted. The markup_text routine is used to add identifier tags to the original text. Different types of information can be highlighted in different colors by using an appropriate Internet browser program such as NETSCAPE, for example.

The outputh17 routine is used to convert the MedLEE output to an appropriate form for storage in database (xformtodb) and to write the MedLEE output in an HL7 in coded format. This process uses synonym knowledge and an encoding knowledge base.

The output generated by the MedLEE program is a frame-based representation wherein each frame specifies the informational type, value, and modifier slots (which are also frames). See C. Friedman, J. Starren, S. Johnson, "Architectural Requirements For a Multipurpose Natural Language Processor in The Clinical Environment," *Proceedings of SCAMC*, pp. 347–351 (1995). Consider the text data input "moderately enlarged spleen". A corresponding intermediate output, as shown below, is a frame denoting a problem, which has the value enlarged; in addition, there are degree and body location modifiers with the values moderate and spleen respectively:

[problem,enlarged,[degree,moderate],[bodyloc,spleen]]

The intermediate output undergoes several mappings before the corresponding structured word term (structured output) is created. Compositional mapping, for example, is required in order to compose components of multi-word phrases that are separated in the original text; another type of mapping is necessary to translate target terms into controlled vocabulary concepts. A final mapping is generally performed in order to translate the frame format to the final structured output format of the MedLEE program.

FIG. 3 shows a block diagram of a second embodiment of the information extraction (MedLEE) program of FIG. 1. The modified program 300 includes a tagger routine 16 for linking the structured output described previously with respect to FIG. 1 to the corresponding words in the original sentences of the text data input. Preferably, the tagger 16 utilizes markup languages, such as Hypertext Markup Language (HTML) and Extensible Markup Language (XML), which are derived from Standard Generalized Markup Language (SGML) and which are used rendering documents for the World Wide Web. Widespread adoption of markup languages are evidenced by: the Text Encoding Initiative (TEI) which uses SGML to encode literature; Chemical Markup Language (CML), which involves documentation of chemical compounds using SGML; and Open Financial Exchange (OFE), which is an SGML standard format for interchange of financial transactions.

In accordance with the preferred embodiment of FIG. 3, the tagging schema disclosed herein integrates content-centric and document-centric approaches in that salient clinical information is represented in a structured XML form that contains references to identifiers in the unstructured report where the original words and phrases are assigned unique identifiers. This design is optimal both for searching because it is not dependent on the ordering of the phrases within the text, and for rendering text to users because the structured XML form contains references to appropriate portions of the original text.

XML is a subset of SGML that is computationally less complex than SGML, and therefore simpler and more efficient to process. XML is a language that provides the ability to augment additional elements of information, i.e., tags, to textual documents so as to provide documents that have machine independent. Documents with such formats can be easily manipulated across a variety of different computing platforms, and are structured using varying levels of complexity, i.e., sections, paragraphs, sentences, phrases, etc.

FIG. 4 below is an example of a document which represents an address using XML tags. As shown in FIG. 4, the street, city, state and zipcode tags are nested within an address tag, and the number and street_name tags are nested within the street tag. Having an address in this form provides a way to manipulate documents with address tags in different ways. For example, documents with a specified zip code and street name can be retrieved easily by searching for the text enclosed by the zipcode and street_name tags.

The structure of XML documents is specified using a DTD, which is a set of blueprints related to information about the organization of the document type and consists of specifications concerning the structure of the document. The DTD is used by an XML parser to ensure that a document is valid according to the DTD. The DTD further specifies positions, attributes, cardinality and values of the XML tags.

FIGS. 5–7 are examples of a document tagging schema in accordance with a preferred embodiment of the present invention. The document tagging schema uses a document structure based on Extensible Markup Language (XML), a subset of Standard Generalized Markup Language (SGML), designed for ease of implementation and interoperability with SGML and HTML standards used by most Internet web browsers. As described below, the schema embeds a tagged, structured and encoded representation of the informational content of an original document within an enriched version of the original document. With this schema, for example, radiologists can enrich reports by mapping textual findings of references to regions of a digitized image. Subsequently, users can retrieve and view reports having highlighted images corresponding to a specified query or positive finding. Additionally, since the form of the processed reports is XML, a standard format for textual documents, commercial off-the-shelf and publicly available software can be obtained to manipulate or further process the XML output.

FIG. 5 shows, by way of example and not limitation, a (simplified) document structure or document type definition (DTD) of a clinical report (medleeOut) generated by the MedLEE computer program of FIG. 3. DTD's can be further customized as required depending upon the specific report being generated.

The definitions of the elements (i.e., <!ELEMENT . . . >) delineate the structure of the tags, which are the components of the document. Cardinality is represented using "?" (denoting 0 or 1 element), "+" (1 or more elements), or "*" (0 or more elements). The names and types of values of the attributes of an element are specified using the statement <!ATTLIST . . . >.

The section element of the DTD includes two components: a structured component structured containing structured data, and a tagged textual element tt. The structured component provides a content-centric view of the report, and is essential for enabling reliable and efficient access to information in the document. The structured component also contains information that references corresponding textual portions of the report.

As further shown in FIG. 5, the structured component itself includes one or more components corresponding to a primary finding called problem or procedure. The component problem in turn contains one or more components corresponding to modifiers of the findings, for example, certainty, degree, status, change, bodyloc, region, sid, and idref. The modifier components are also defined in the DTD;

those having no nested structures are defined using the keyword EMPTY, e.g., the definition of sid which specifies a sentence identifier.

The tags representing the primary findings and modifiers also have attributes. For example, problem has an attribute v which must be present (#REQUIRED) and which consists of character data (CDATA), and an attribute idref which is optional (#IMPLIED) and which includes one or more references (IDREFS) to other attributes in the document that are unique identifiers.

The tagged textual element tt is also specified in FIG. 5. It provides a document-centric view of the report because it consists of the original report enriched with tags that delineate and identify textual elements sent (marking sentences) and #PCDATA which is the original textual data. The component sent consists of textual data, phrases phr, or undefined words undef. The component phr has an attribute id whose value is a unique identifier within the report. The idref attributes of the elements of the structured components correspond to the id attributes of the phrases. Similarly the idref attributes of the sid elements of the structured components correspond to the id attributes of the sentences (sent).

FIG. 6 shows an example of a structured component utilized by MedLEE for "tagging" the following input from a "History of Present Illness" section of a physician report: "Intermittent pain in lower abdomen developed on Mar. 4, 1995. There was no swelling in extremities." The structured output includes two problem tags corresponding to the informational type problem. The first problem tag has the value "pain," itself having a reference to identifier p2 along with other modifiers, themselves also having their own values and identifiers. The second problem tag has the value "swelling" and reference identifier p13, the "swelling value itself having the modifiers certainty, body location (bodyloc) and sentence identifier (sid). The sentence identifier sid includes a section number, paragraph number within the section, and the sentence number within the paragraph.

The problem tag also has embedded tags which are modifiers. The bodyloc modifier has an attribute v whose value is "abdomen" and also an idref attribute. Tags that correspond to phrases in the original textual report have idref attributes. However some tags do not have an idref attribute because they do not correspond to a phrase in the original report but to contextual information added during parsing. For example parsemode specifies the method used to structure the information. The parse mode is a measure of accuracy of the output based on the mode used to interpret the sentence and obtain the structured form. Mode 1 is likely to be the most accurate interpretation whereas Mode 5 is likely to be the least accurate.

In the example shown in FIG. 6, the values of the v attribute are frequently the same as the corresponding words and phrases in the report. However as shown in FIG. 8, the value of the v attribute can be different from the corresponding phrase in the actual report because it corresponds to a controlled vocabulary term, e.g., "splenomegaly", which is different from the canonical textual form, e.g., "enlarged spleen".

FIG. 7 shows a tagged text element tt corresponding to the text data input described in connection with FIG. 6. As shown in FIG. 7, the tt component is the same as the original report except that it is enriched with tags that uniquely identify sentences and phrases. A tag sent notes the beginning of a new sentence and includes an attribute id whose value identifies the section number, paragraph number and sentence number of the sentence in the original report. This information is useful for certain applications. For example, discharge summaries in hospitals generally include a "History of Present Illness" section containing the chief complaint, and a "Hospital Course" section containing the discharge plan. Furthermore, sentences which are adjacent and in the same paragraph generally refer to the same body locations and time period, unless another body location or time period is explicitly stated. Writesgmlform writes structured output in XML form similar to the example shown in FIG. 6. Writeflats write structures output in tabular form which is convenient for importing into a database or spreadsheet. Markup_text writes the tagged textual portion similar to the example shown in FIG. 7.

The tag phr denotes the beginning of a single or multi-word phrase of the report. It has an id attribute, whose value is a unique identifier of the phrase within the report. Phrases which are referenced in the structured component are shown in FIG. 7 and those that are not referenced are omitted. For example, the word "no" in the phrase "no evidence of" is preceded by the begin phr tag identified by "p11", and the word "of" is followed by the end phr tag. Sent may also have an element which is an undef tag. This tag surrounds words which are not found in the lexicon. This may prove useful for other applications, such as further training of the NLP system or identification of proper names.

Figures 8, 9:
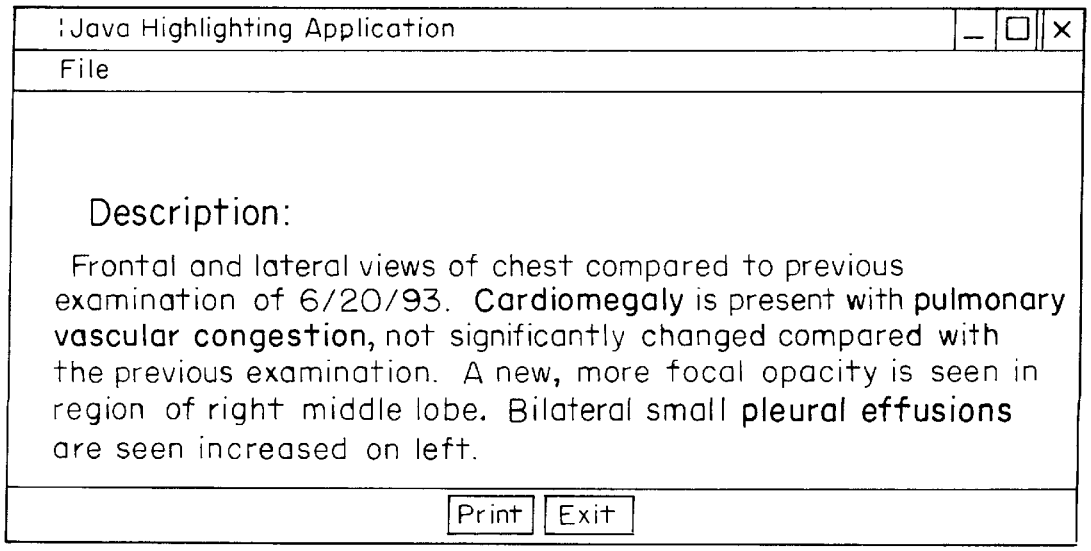
FIG. 8 is another example of a structured component in accordance with the information extraction system of FIG. 3.
FIG. 9 is a sample output wherein information extracted from a document input is highlighted and viewable via a web browser in accordance with the information extraction system of FIG. 3.

FIG. 8 shows a structured component for the phrase "the spleen and liver appear to be moderately enlarged". The values of the id attributes of the tag phr are based on the assumption that the phrase appears at the beginning of the report so that the first word "the" of the phrase is assigned a position 1. The attribute idref for splenomegaly has two values that reference the individual components "enlarged" and "spleen" that constitute the concept splenomegaly.

The structured representations of certain sentences are not always as straightforward as the example shown above, particularly if the text is complex or contains conjunctions. For example, the sentence "the spleen and liver are enlarged" contains the concepts splenomegaly and hepatomegaly, which are controlled vocabulary concepts associated with the phrases "enlarged spleen" and "enlarged liver" respectively. A corresponding the tagged text element is:

The <phr id="p1">spleen</phr><phr id="p2">appears to be </phr><phr id="p3>moderately</phr><phr id="p5>enlarged </phr>.

In the text, the individual word components of "enlarged spleen" are "enlarged" and "spleen" which are separated from each other, as are the words "enlarged" and "liver". Moreover the word "enlarged" pertains to both the words "spleen" and "liver". In this situation, as shown in FIG. 8, two of the idref attributes are multi-valued because they are associated with the non-contiguous single word phrases identified by references to p2 and p7 which correspond to splenomegaly and to p4 and p7 which correspond to hepatomegaly.

FIG. 9 shows a sample "tagged" report generated by the MedLEE program of FIG. 3. The output shows the "description" section of a radiological report associated with the clinical condition "congestive heart failure" where terms associated with congestive heart failure are highlighted. The report was retrieved and highlighted using a JAVA program and structured output generated by MedLEE. The identifiers (idrefs) corresponding to the structured findings associated with the condition were used to highlight the appropriate phrases in the textual report.

As noted above, the tagged report of FIG. 9 was retrieved as being positive for a finding of congestive heart failure. Notice that the term congestive heart failure is not in the report, but findings suggestive of congestive heart failure are, i.e., cardiomegaly, pulmonary vascular congestion, and pleural effusions. Also notice that these three phrases are highlighted in the report. When a relevant finding associated with congestive heart failure was detected, the value of the idref attribute(s) is used to identify textual phrases to be highlighted.

Preferably, the structured output in the text report is placed at the beginning of each section of the report. However, it may be placed at the beginning of the report so that conceptually it is thought of as an index or codification of the contents of the report. It could also be made to precede each sentence. Also, in another preferred embodiment, more substantial variation of the schema involves more information in the phr tags by adding additional attribute-value pairs other than the id attribute. For example the semantic and syntactic categories of the phrases could also be supplied by adding the appropriate attributes sem and syn to the phrase tag.

When performing a query using the structured output, it may be desirable to display different types of relevant information, for example, modifiers may be displayed as well as primary findings. As such, it may be desirable to highlight more than just the primary finding by using different colors to highlight different types of information including but not limited to body location, degree and certainty modifiers.

In order to evaluate the accuracy of the MedLEE program of FIG. 3, a study was conducted wherein queries associated with certain clinical conditions, such as congestive heart failure and neoplasm, were generated using the modified version of MedLEE described above. It was shown that the modified MedLEE program were not significantly different from clinicians in retrieving reports associated with the specified conditions.

The study was conducted using two hundred handwritten reports, each of which was by at least six of twelve clinicians participating in the study. The clinicians were asked to read the reports and check off any number of clinical conditions they felt were associated with each report. All 200 reports were then processed and converted into the enriched XML format using the modified version of the MedLEE program discussed herein. The XML output documents were then parsed successfully using the DTD and an XML validating parser. The validating parser was used to automatically convert the XML structured output (output A) to a line format output (output B). A previous version of MedLEE was used to process the same report inputs and generate a structured output (output C) in the same line format used to create output B. Outputs B and C were then compared and verified to be identical.

In summary, a computer system has been disclosed that embeds structured encoded information within a textual report using XML. Having the capability to associate structured output with portions of the original report adds significant functionality to the report. Applications or user of the above-described system can utilize the structured component of the XML output to obtain highly specific retrieval capabilities and then be able to highlight relevant information, thereby facilitating manual review. Preferably, a special browser can be used to highlight specific information, such as diagnoses, procedures performed, medications given, or pertinent history, in order to assist the user in the reading of a report.

Thus, it has been shown that natural language processing can be used to automatically creating an enriched document that contains a structured component whose elements are linked to corresponding portions of the original textual report. The integrated document model used by the tagging feature of the above-described system provides a representation wherein textual documents or reports containing specific information can be accurately and efficiently retrieved automatically by querying the structured components. If manual review of the documents is desired, the salient information in the original reports can also be identified and highlighted. Using an XML model of tagging provides an additional benefit that software tools that manipulate XML documents are readily available.

By modifying the knowledge base components, the above-described natural language processing system of FIGS. 1–3 can further be adapted to extract a variety of different information from scientific or technical natural language text sources. For example, by using different lexicon and grammar knowledge bases 101 and 102, the natural language processing system of the present invention can be adapted for extracting, for example, gene, protein and other related information from genomics-related literature. An example of such a lexicon, lexsemsub.tmp, lexsemact.tmp, and lexsyn.tmp collectively, is provided in the Appendix; gengram.pl, which also provided in the Appendix, is an example of a grammar for use with genomics literature. Optionally, the genomics-related application of the above-described natural language processing system may also require related mapping and coding knowledge bases.

Although the present invention has been described in connection with particular embodiments thereof, it is to be understood that various modifications, alterations and adaptions may be made by those skilled in the art without departing from the spirit and scope of the invention. It is intended that the invention be limited only by the appended claims.

What is claimed is:

1. A method for extracting information from natural-language text data, comprising:

parsing the text data to determine the grammatical structure of the text data, said parsing step comprising the step of referring to a domain parameter having a value indicative of a domain from which the text data originated, the domain parameter corresponding to one or more rules of grammar within a knowledge base related to the domain to be applied for parsing the text data;

regularizing the parsed text data to form structured word terms; and tagging the text data with a structured data component derived from the structured word terms.

2. The method according to claim 1, further comprising preprocessing the data prior to parsing, with preprocessing comprising the step of referring to the domain parameter.

3. The method according to claim 1, further comprising the step of encoding at least one term of the regularized phrase, with encoding comprising the step of referring to the domain parameter.

4. The method according to claim 1, further comprising filtering the regularized phrase.

5. The method according to claim 1, further comprising referring to an additional parameter which is indicative of the degree to which subphrase parsing is to be carried out.

6. The method according to claim 1, further comprising referring to an additional parameter which is indicative of desired filtering.

7. The method according to claim 1, further comprising referring to an additional parameter which is indicative of a desired type of output.

8. The method according to claim 1, further comprising referring to an additional parameter which is indicative of a desired output format.

9. The method according to claim 1, wherein said parsing step further comprises segmenting the text data by sentences.

10. The method according to claim 1, wherein said parsing step further comprises:
    segmenting the text data by sentences; and
    segmenting each of the sentences at identified words or phrases.

11. The method according to claim 1, wherein said parsing step further comprises:
    segmenting the text data by sentences; and
    segmenting each of the sentences at a prefix.

12. The method according to claim 1, wherein said parsing step further comprises skipping undefined words.

13. The method according to claim 1, wherein said parsing step further comprises:
    identifying one or more primary findings in the text data; and
    identifying one or more modifiers associated with the primary findings.

14. The method according to claim 1, further comprising performing error recovery when parsing of the text data is unsuccessful.

15. The method according to claim 14, wherein said error recovery step comprises:
    segmenting the text data; and
    analyzing the segmented text data to achieve at least a partial parsing of the unsuccessfully parsed text data.

16. The method according to claim 1, wherein said tagging step comprises providing the structured data component in a Standard Generalized Markup Language (SGML) compatible format.

17. The method according to claim 1, wherein said tagging step comprises providing the structured data component in Extensible Markup Language (XML).

18. The method according to claim 1, further comprising highlighting one or more primary findings in the natural-language text data.

19. A computer system for extracting information from natural-language text data, comprising:
    means for parsing the natural-language text data, said parsing means comprising means for referring to a domain parameter having a value indicative of a domain from which the natural-language text data originated, and wherein the domain parameter corresponds to one or more rules of grammar within a knowledge base related to the domain to be applied for parsing the natural-language text data;
    means for regularizing the parsed text data to form structured word terms; and
    means for tagging the text data with a structured data component derived from the structured word terms.

20. The system according to claim 19, further comprising means for preprocessing the data prior to parsing, with the preprocessing means comprising means for referring to the domain parameter.

21. The system according to claim 19, further comprising means for encoding at least one term of the regularized phrase, with the encoding means comprising means for referring to the domain parameter.

22. The system according to claim 19, further comprising means for filtering the regularized phrase.

23. The system according to claim 19, further comprising means for referring to an additional parameter which is indicative of the degree to which subphrase parsing is to be carried out.

24. The system according to claim 19, further comprising means for referring to an additional parameter which is indicative of desired filtering.

25. The system according to claim 19, further comprising means for referring to an additional parameter which is indicative of a desired type of output.

26. The system according to claim 19, further comprising means for referring to an additional parameter which is indicative of a desired output format.

27. The system according to claim 19, wherein said parsing means further comprises means for segmenting the text data by sentences.

28. The system according to claim 19, wherein said parsing means further comprises:
    means for segmenting the text data by sentences; and
    means for segmenting each of the sentences at identified words or phrases.

29. The system according to claim 19, wherein said parsing means further comprises:
    means for segmenting the text data by sentences; and
    means for segmenting each of the sentences at a prefix.

30. The system according to claim 19, wherein said parsing means further comprises means for skipping undefined words.

31. The system according to claim 19, wherein said parsing means further comprises:
    means for identifying one or more primary findings in the text data; and
    means for identifying one or more modifiers associated with the primary findings.

32. The system according to claim 19, further comprising means for performing error recovery when parsing of the text data is unsuccessful.

33. The system according to claim 32. wherein said error recovery means comprises:
    means for segmenting the text data; and
    means for analyzing the segmented text data to achieve at least a partial parsing of the unsuccessfully parsed text data.

34. The system according to claim 19, wherein said tagging means comprises means for providing the structured data component in a Standard Generalized Markup Language (SGML) compatible format.

35. The system according to claim 19, wherein said tagging step comprises means for providing the structured data component in Extensible Markup Language (XML).

36. The system according to claim 19, further comprising means for highlighting one or more primary findings in the original text data.

37. A combination of the system according to claim 19 with an interface module for enabling the system to receive input from and/or to produce standardized output for the World-Wide Web and/or a local network.

38. The combination according to claim 37, further comprising means for viewing the output using a standardized browser.

39. The combination according to claim 38, wherein the browser is a Web-browser.

* * * * *